Figure 1:
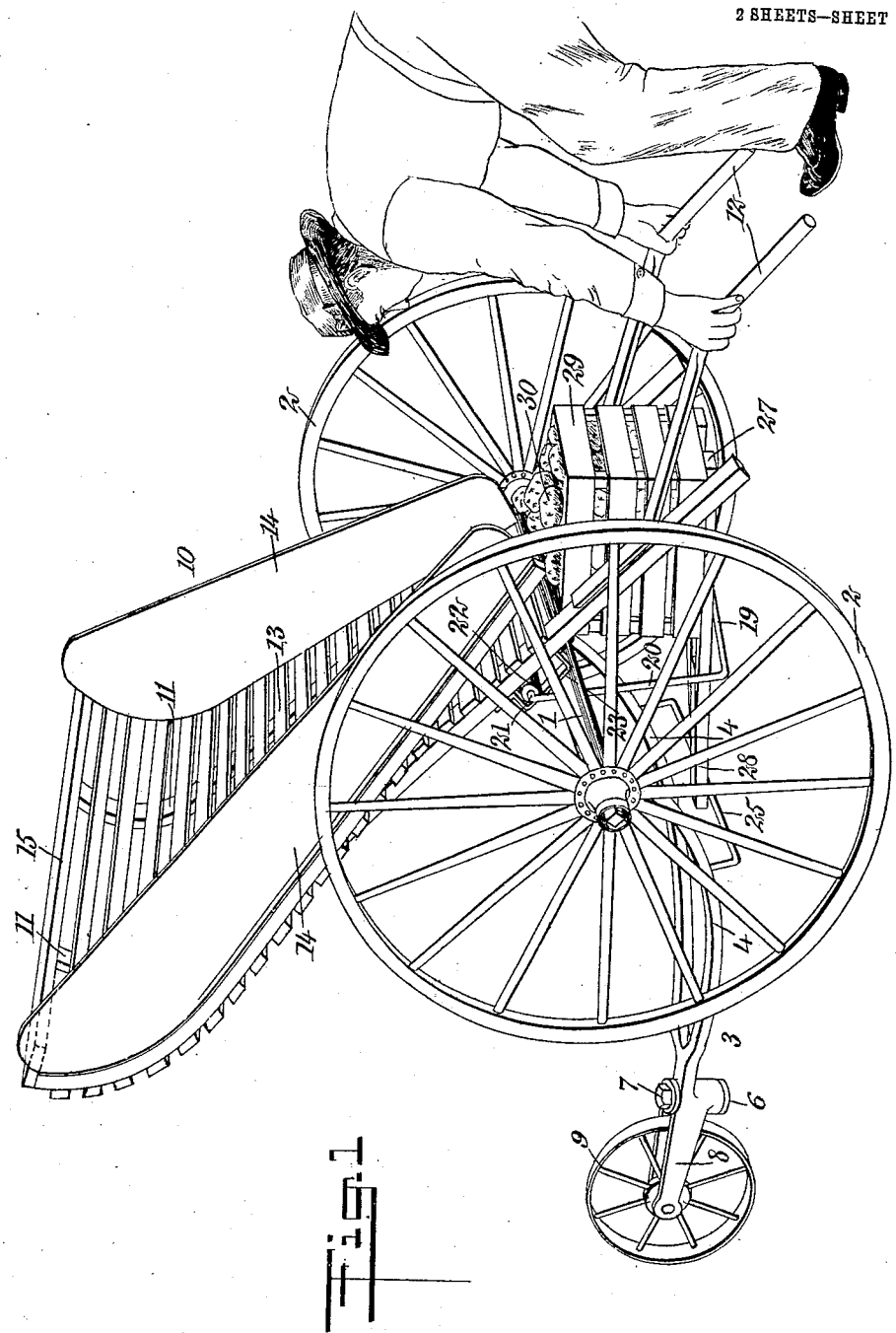

W. L. GRIFFIN.
HARVESTING DEVICE.
APPLICATION FILED DEC. 5, 1907.

914,825.

Patented Mar. 9, 1909
2 SHEETS—SHEET 1.

WITNESSES
F. D. Sweet
John K. Brackirogel

INVENTOR
Wilmer L. Griffin
BY Munn & Co
ATTORNEYS

W. L. GRIFFIN.
HARVESTING DEVICE.
APPLICATION FILED DEC. 5, 1907.
914,825.
Patented Mar. 9, 1909.
2 SHEETS—SHEET 2.
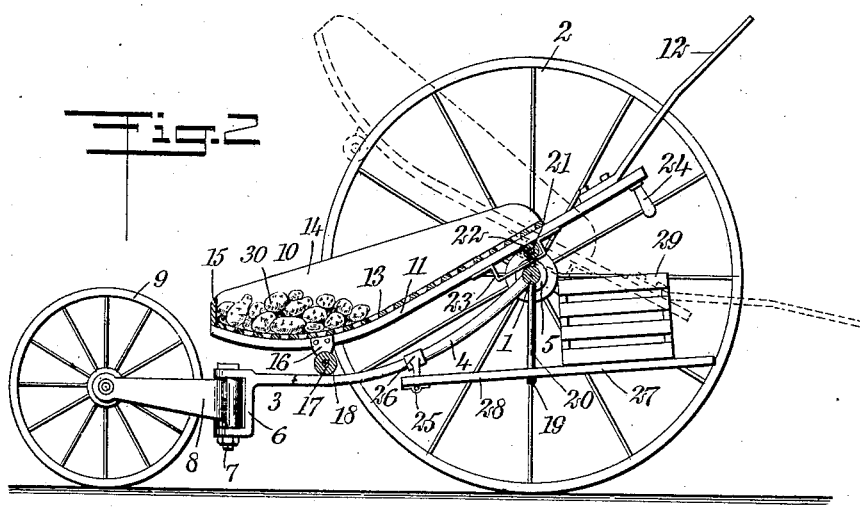
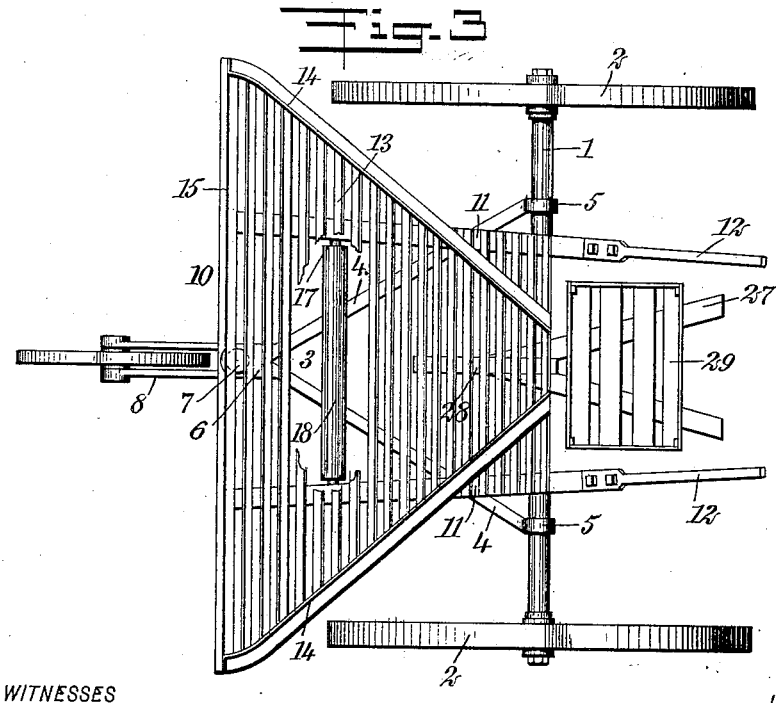
WITNESSES
F. D. Sweet
John K. Brachvogel
INVENTOR
Wilmer L. Griffin
BY Munn & Co
ATTORNEYS

UNITED STATES PATENT OFFICE.

WILMER LINCOLN GRIFFIN, OF SCOTTVILLE, MICHIGAN, ASSIGNOR OF THREE-FOURTHS TO WILMER L. GRIFFIN, OF SCOTTVILLE, MICHIGAN, AND ONE-FOURTH TO ORIN A. EATON, OF KALAMAZOO, MICHIGAN.

HARVESTING DEVICE.

No. 914,825.  Specification of Letters Patent.  Patented March 9, 1909.

Application filed December 5, 1907. Serial No. 405,205.

*To all whom it may concern:*

Be it known that I, WILMER L. GRIFFIN, a citizen of the United States, and a resident of Scottville, in the county of Mason and State of Michigan, have invented a new and Improved Harvesting Device, of which the following is a full, clear, and exact description.

This invention relates to harvesting devices and more particularly to apparatus used in the harvesting of potatoes and other similar produce.

An object of the invention is to provide a simple, strong and durable harvesting device by means of which potatoes can be freed from the earth adhering to them, and by means of which the cleaned tubers can be easily and rapidly filled into receptacles therefor.

A further object of the invention is to provide a harvesting device mounted upon a wheeled frame so that it can be advanced without difficulty in a potato or other field, which has means for receiving the potatoes or other tubers as the same are dug up, which serves for the easy and rapid freeing of the tubers from adhering earth, and by means of which the tubers can be directed into crates or other receptacles.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is an enlarged perspective view showing my invention in operation; Fig. 2 is a longitudinal section of the harvesting device, showing certain of the parts in different position in dotted outline; and Fig. 3 is a plan view of the device showing parts broken away.

Before proceeding to a more detailed explanation of my invention, it should be understood that the same, while particularly useful in the harvesting of potatoes can be used for a similar purpose in connection with other produce, especially tubers.

Potatoes or other tubers, when they are dug up in harvesting, generally have adhering thereto considerable quantities of earth. Before packing the potatoes in crates or other receptacles it is necessary to free them from the adhering material. The tubers are usually dug up by means of forks of special form which are manually operated by the harvesters.

My invention is used as an auxiliary in potato harvesting of the usual kind, that is, the potatoes are removed from the earth by means of forks, and, together with the adhering earth are thrown into the riddle of the harvesting device. By means of the latter the adhering material is loosened from the potatoes and when the latter are clean the riddle is used to direct the potatoes to crates or other receptacles.

Referring more particularly to the drawings, I provide an axle 1 having at the ends, supporting wheels 2 which may be of any preferred or common form. A frame 3 having diverging side members 4 is secured to the axle 1 by means of eyes 5 formed at the ends of the side members 4. At the end remote from the axle, the frame 3 has a socket 6, to which is secured by a bolt 7, a fork 8. Between the sides of the latter is movably arranged a guide wheel 9.

The riddle 10 is arranged upon the frame 3 and has longitudinal members 11 carrying at their ends, handles 12. The riddle comprises a slatted bottom 13 and sides 14. The riddle may be fashioned from any suitable material such as wood, and has the sides preferably formed from sheet metal. The sides 14 converge toward the outlet opening at the rear of the riddle, forming a discharge chute for directing the tubers from the riddle when the latter is tilted, as is shown most clearly in Fig. 1. At the end remote from the outlet opening between the sides 14, the bottom of the riddle is turned upward and has a cross frame 15 which, together with the up-turned portion of the bottom constitutes the end wall of the riddle. The longitudinal members 14 have ears 16 between which is mounted a spindle 17 carrying a roller 18. The latter rests upon the side members 4 of the frame and supports the riddle thereupon, permitting the riddle to be easily reciprocated upon the frame.

A U-shaped hanger 19 has its sides 20 arranged in openings of the axle and extending thereabove. The ends of the sides 20 are laterally disposed to form keepers 21 carrying rollers 22. The latter engage offset guide brackets 23 carried at the under sides of the longitudinal riddle members 11. The brackets 23 limit the movement of the riddle when the same is reciprocated and permit the pivoting of the riddle by means of the handles to tilt the riddle. The longitudinal members 11 have grips 24 which can be easily grasped by the operator of the device, to permit the riddle to be reciprocated.

A cross-bar 25 is located between the side members 4 of the frame and is secured thereto by holders 26. A receptacle support 27 is arranged underneath the riddle and is carried by the hanger 19. The support has an arm 28 which is loosely fastened to the cross-bar 25. The support serves to hold a crate 29 or some other receptacle adapted to receive potatoes 30 from the riddle, and can be moved to one side or the other to remove the crate from the discharge opening of the riddle.

The device is so proportioned that the wheels 2 can straddle two rows of potatoes, with the guide wheel 9 arranged between the rows. The potatoes, with the adhering earth are thrown into the riddle by the diggers and the operator of the device then grasps the grips 24 and reciprocates the riddle until the potatoes are freed from earth. When a suitable quantity of potatoes has been cleaned, the operator grasps the handles 12 and tilts the riddle to permit the potatoes to advance from the same into the receptacle 29 carried by the support. The arrangement of the latter is such that the receptacle is located underneath the riddle and in position to receive potatoes from the outlet opening of the same, as is shown most clearly in Fig. 1. The handles 12 or the grips 24 are also used to propel the device and to guide it in one direction or the other.

Having thus described my invention I claim as new, and desire to secure by Letters Patent:

1. In a device of the class described, a wheeled frame, and a riddle movably mounted upon said frame, said riddle having brackets, said frame having rollers engaging said brackets whereby said riddle is slidably and pivotally mounted upon said frame.

2. In a device of the class described, a wheeled frame, and a riddle movably mounted upon said frame, said riddle having a roller supporting it upon said frame, said frame having rollers, said riddle having elongated offset brackets adapted to receive said rollers of said frame whereby said riddle is slidably and pivotally mounted upon said frame.

3. In a device of the class described, a frame, a riddle movably mounted upon said frame, and a receptacle supporting frame pivoted at one end upon said frame and slidably held at a point remote from its pivoted end.

4. In a device of the class described, a frame, a riddle pivotally and slidably mounted upon said frame and having a discharge chute, said riddle, at a point remote from its slidable and pivotal attachment to said frame having a roller movably engaging the same, said riddle having a discharge chute, and a support for a removable receptacle, said support being arranged under said riddle at a point adjacent to said chute and being displaceable.

5. In a device of the class described, a frame, a riddle slidably and pivotally mounted upon said frame and having a discharge chute, said frame having a hanger, and a receptacle support pivoted at one end upon said frame and slidably arranged upon said hanger.

6. In a device of the class described, a riddle having converging sides forming between their adjacent ends an outlet chute, said riddle having slats arranged transversely of said sides and being slidably and pivotally mounted, said riddle further having the bottom, at the end remote from said chute, upwardly disposed to form an end wall.

7. In a device of the class described, a frame having keepers provided with rollers, and a riddle mounted upon said frame and having brackets slidably and pivotally engaging said rollers, said riddle slidably engaging said frame at a point remote from said brackets.

8. A device of the class described, comprising an axle, wheels supporting said axle, a frame secured to said axle, a riddle arranged above said frame and having a roller removably engaging the same, a hanger carried by said axle and having laterally disposed ends projecting thereabove, said riddle having guide brackets engaging said ends, said ends carrying rollers at said brackets, said riddle having means for its manual operation, and means movably supported by said hanger for carrying a removable receptacle.

9. In a device of the class described an axle, wheels supporting said axle, a frame secured to said axle and having a pivoted guide wheel, a riddle arranged above said frame and having a roller engaging the same, a U-shaped hanger carried by said axle and having laterally disposed ends projecting thereabove, said riddle having guide brackets engaging said ends, said ends carrying rollers at said brackets, said riddle having handles, and a support secured to said frame and carried by said hanger, said support being adapted to hold a receptacle, said riddle having a slatted bottom disposed to form an end wall of said riddle, said riddle further having converging sides forming a discharge chute having the outlet adjacent to said support.

In testimony whereof I have signed my name to this specification in the presence of two subscribing witnesses.

WILMER LINCOLN GRIFFIN.

Witnesses:
    W. E. BLAKE,
    Mrs. RALPH MELLOR.